US010972374B1

(12) United States Patent
Kurtz et al.

(10) Patent No.: US 10,972,374 B1
(45) Date of Patent: Apr. 6, 2021

(54) MANAGED TIME SERVICE FOR COMPUTE RESOURCES

(71) Applicant: Amazon Technologies, Inc., Seattle, WA (US)

(72) Inventors: Douglas Cotton Kurtz, Sammamish, WA (US); Umesh Chandani, Seattle, WA (US); Adithya Bhat, Seattle, WA (US); Leslie Johann Lamprecht, Sammamish, WA (US); Cristian Gabriel Gafton, Palo Alto, CA (US); Joseph Elmar Magerramov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 489 days.

(21) Appl. No.: 15/822,066

(22) Filed: Nov. 24, 2017

(51) Int. Cl.
*H04L 12/26* (2006.01)
*H04L 29/12* (2006.01)

(52) U.S. Cl.
CPC .............. *H04L 43/50* (2013.01); *H04L 43/16* (2013.01); *H04L 61/1511* (2013.01)

(58) Field of Classification Search
None
See application file for complete search history.

(56) References Cited

U.S. PATENT DOCUMENTS

| | | | | |
|---|---|---|---|---|
| 6,769,031 B1* | 7/2004 | Bero | ................. | H04L 29/12066 707/999.01 |
| 9,537,739 B1* | 1/2017 | Wang | ...................... | G06F 11/07 |
| 9,830,111 B1* | 11/2017 | Patiejunas | ............. | G06F 3/0689 |
| 2003/0048811 A1* | 3/2003 | Robie, Jr. | ............. | H04J 3/0667 370/509 |
| 2003/0225876 A1* | 12/2003 | Oliver | ................... | H04L 43/045 709/224 |
| 2010/0250748 A1* | 9/2010 | Sivasubramanian | ........................ | G06F 9/5016 709/226 |
| 2012/0096166 A1* | 4/2012 | Devarapalli | ........ | H04L 67/1002 709/226 |
| 2016/0179850 A1* | 6/2016 | Martin | .................. | G06F 16/214 707/634 |
| 2020/0162262 A1* | 5/2020 | Shekh-Yusef | ......... | H04L 9/3236 |

OTHER PUBLICATIONS

DNS zones revisited Ward van Wanrooij, University of Twente w.a.h.c.vanwanrooij@student.utwente.nl 2nd Twente Student Conference on IT, Enschede Jan. 21, 2005 (Year: 2005).*

* cited by examiner

*Primary Examiner* — Dhairya A Patel
(74) *Attorney, Agent, or Firm* — Nicholson De Vos Webster & Elliott LLP

(57) ABSTRACT

Techniques for providing a managed time service are described. A control plane of the managed time service can receive data indicating one or more network time protocol (NTP) hosts are active. The control plane can update a zonal domain name system (DNS) to include the one or more NTP hosts. The at least one compute resource accesses the one or more NTP hosts using the zonal DNS, and the one or more NTP hosts provide time data to the at least one compute resource. The control plane can receive performance data from the one or more NTP hosts and automatically scale the one or more NTP hosts based on the performance data.

18 Claims, 7 Drawing Sheets

MANAGED TIME SERVICE FOR COMPUTE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF DRAWINGS

Various embodiments in accordance with the present disclosure will be described with reference to the drawings, in which.

DETAILED DESCRIPTION

Figure 1:
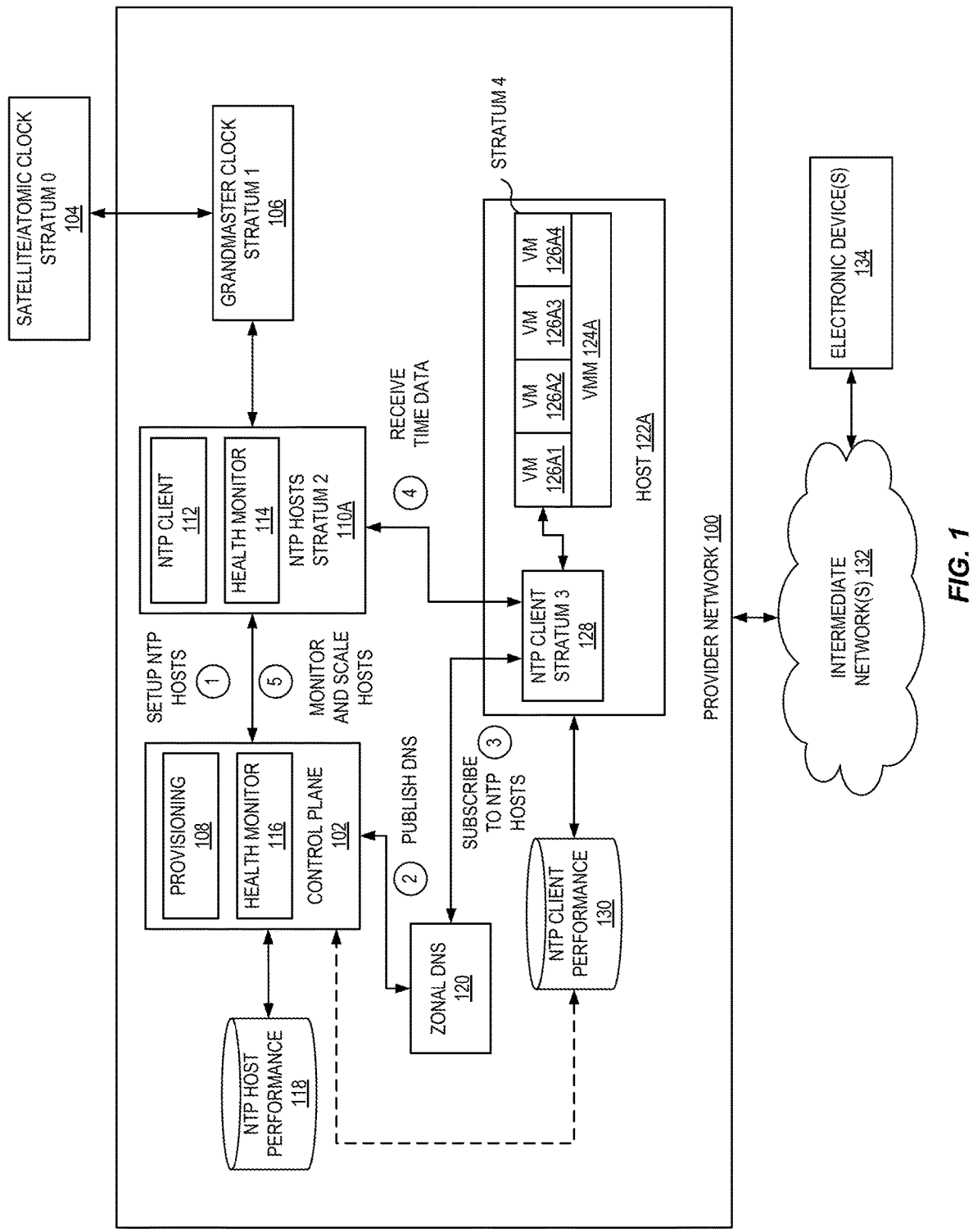
FIG. 1 is a diagram illustrating an environment for a managed time service according to some embodiments.

Various embodiments of methods, apparatus, systems, and non-transitory computer-readable storage media for a managed time service for compute resources are described. The managed time service can include a control plane configured to scale network time protocol (NTP) hosts automatically/incrementally, which may include adding additional NTP hosts as more NTP clients are added as well as automatically deactivating NTP hosts based on performance.

As NTP hosts are activated and deactivated, they publish availability messages to the control plane. The control plane can then identify newly available hosts and newly deactivated hosts. The control plane can add or remove these hosts to a zonal domain name service (DNS) which can manage hosts based on location. NTP accuracy is affected by network delay. For example, accuracy degrades as network delay increases and when network routes vary (e.g., where the route of the sending packets is not necessarily the same as the route of the receiving packets) it can be difficult to account for this delay. Accordingly, embodiments assign local NTP hosts to clients using the zonal DNS to reduce the impact of this delay on accuracy. If a local host fails or is taken out of service, a non-local host may be temporarily used as a replacement.

A virtualized hardware service environment may include multiple host computers that are each running multiple virtual machines on behalf of various customers. An NTP host may be allocated for each host computer, or set of host computers. However, host computers are generally not location aware. As a result, the host computers do not identify a local NTP host. By connecting to a zonal DNS, the control plane can determine the location of the host computer and identify one or more local NTP hosts for that host computer. The zonal DNS may be reached using a generic DNS name, enabling host computers to be preconfigured with a network location to contact at startup to connect to the managed time service.

In some embodiments, the control plane continually monitors NTP hosts to determine performance data. Performance data can be determined by analyzing on-host operating system metrics, NTP request load saturation, and NTP accuracy data relative to other NTP hosts in the fleet of NTP hosts. Performance data can be published to a data store from which the control plane can process the data. In some embodiments, the control plane calls NTP hosts directly to measure external performance of the host (e.g., how the hosts perform in serving clients) over the network. If over a configurable time period the NTP host is determined to be underperforming, the control plane deactivates the NTP host and removes the host from the zonal DNS pool. When an NTP host is deactivated, NTP clients request a new NTP host from the zonal DNS and are assigned a new NTP host.

Embodiments provide a managed time service that can be used natively by instances in a hardware virtualization service. This enables customers to use the time service with minimal configuration, provides highly accurate time, and additionally provides improved security to customer networks. Using a third party or public time service provides less accurate time and requires careful network configuration to enable the external time service to be used, without exposing the user's network to unwanted risk. This means customers do not need to open additional ports in their security group configurations for access to public domain NTP servers on the internet. Embodiments of the managed time service also provide reliable time across various locations in a provider network, ensuring that regardless of where the customer's infrastructure is physically located, there will still be access to reliable time services, even in globally distributed deployments.

FIG. 1 is a diagram illustrating an environment for a managed time service according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 132 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers. The users may access the provider network using one or more electronic devices 134 connected to the intermediate networks 132. The one or more electronic devices may include computing devices such as desktop, laptop, or mobile computing devices, servers, virtual machines, or other devices.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Provider network 100 may include hardware virtualization technology that enables multiple operating systems to run concurrently on a host computer (e.g., host 122A), i.e. as virtual machines (VMs) 126 on the hosts 122. The VMs 126 may, for example, be executed in slots on the hosts 122 that are rented or leased to customers of a network provider. A hypervisor, or virtual machine monitor (VMM) 124, on a host 122 presents the VMs 126 on the host with a virtual platform and monitors the execution of the VMs 126. Each VM 126 may be provided with one or more local IP addresses; the VMM 124 on a host 122 may be aware of the local IP addresses of the VMs 126 on the host. The provider network 100 may, for example, provide customers the ability to implement virtual computing systems (VMs 126) via a hardware virtualization service.

As discussed, control plane 102 provides a managed time service in provider network 100. The managed time service architecture is organized by strata. One or more authoritative time sources 104, such as satellite navigation systems and atomic clocks, are stratum 0 sources. Grandmaster clock is a stratum 1 source, which receives time data from authoritative sources 104. The grandmaster clock can receive the time data from the authoritative sources via a satellite navigation system antenna (e.g., global positioning system (GPS), Galileo position system, BeiDou navigation satellite system, etc.) and pass the time data on to other strata devices. In some embodiments, the grandmaster clock may synchronize with two or more authoritative sources.

As shown at numeral 1, a provisioning module 108 can set up a plurality of NTP hosts 110A. The NTP hosts are stratum 2 devices, which synchronize their time with grandmaster clock 106. In some embodiments, the grandmaster clock may be implemented as an atomic clock. In such an implementation, the grandmaster clock can synchronize with the stratum 0 authoritative source. By using an atomic clock as the grandmaster clock, the grandmaster clock can maintain accuracy over an extended period (e.g., 100 plus days) in case of loss of connection with the authoritative source or if the authoritative source becomes compromised or untrusted. NTP hosts 110A are the scaling tier of the managed time service. The number of NTP hosts 110A can be managed based on the number of number of hosts 122A being served in the system. Each NTP host includes an NTP client 112 which polls the grandmaster clock 106 (e.g., the next stratum up from the NTP hosts) to receive time data (e.g., a current local time, current universal time, etc.). Each NTP host may also include a health monitor 114 which determines internal performance data, such as disk usage, temperature, offset, packet loss, etc. Control plane 102 can include a health monitor 116 which monitors external performance data of the NTP hosts 110A, such as response time, response failure, etc. NTP host performance can be evaluated dynamically by health monitor 116 as the performance data is received. In various embodiments, the performance data collected by control plane 102 and NTP hosts 110A can be stored in an NTP host performance data store 118 for later analysis.

Once the NTP hosts are provisioned, control plane 102 can publish the NTP hosts to zonal DNS 120, as shown at numeral 2. The control plane can manage the NTP hosts based on the locality of host computers 122A. The control plane can add NTP hosts to the zonal DNS based on their location. When hosts 122A request an NTP host, they can be connected to a local NTP host. An NTP host may be local to a host computer when it is executing on the host computer or executing on one host computer in a set of host computers. At numeral 3, an NTP client 128 on host 122A can subscribe to one or more NTP hosts through zonal DNS 120. The NTP clients connect to the zonal DNS pool and can connect to multiple NTP hosts from the pool (e.g., address data for all of the NTP hosts in the zonal DNS pool may be provided). An NTP client may be bound to the multiple NTP hosts such that the NTP client continues to connect to the same multiple NTP hosts. If one of the NTP host is deactivated, the NTP client can automatically acquire a new NTP client from the zonal DNS pool. If an NTP host is deactivated, the NTP client can connect to another from the same pool automatically. The NTP client 128 is a stratum 3 device which polls the NTP hosts 110A for time data, as shown at numeral 4, and synchronizes local time on host computer 122A with the time received from the NTP hosts 110A. NTP client 128 can provide time to instances 126A local to host 122A. Each instance 126A is a stratum 4 device. By providing time data close to the host 122A, the impact of network delay on time accuracy is reduced. As discussed further below, when a new host is deployed, a corresponding NTP client and NTP host can also be activated. In some embodiments, a local IP address can be provided for NTP clients to link to an NTP host. Each host can be preconfigured with the local link such that at startup, the NTP host can be queried without additional setup.

At numeral 5, the control plane 102 can monitor and scale NTP hosts 110A. NTP host performance data of NTP hosts can be stored in host monitor performance 118 and client performance data can be stored in client performance data store 130. In some embodiments, NTP host performance data can be received continuously from the NTP hosts 110A and/or in response to a request from the health monitor 116. NTP client performance data 130 can be retrieved asynchronously or periodically for analysis after it is collected. This data can be monitored over time to determine whether a given NTP host is underperforming over a configurable amount of time. In some embodiments, monitoring may include collecting statistics performance data from NTP clients 128. Each NTP client 128 can connect to one or more NTP hosts 110A. The NTP client can track which NTP host it is connected to and report that accuracy of the time it is receiving. For example, different network routes in the system can affect accuracy. By analyzing this performance data can be used by control plane 102 can identify inefficient network routes. An inefficient network route can prompt additional network analysis and/or connection to a different NTP host to identify a more efficient network path. In some embodiments, each NTP client can preferentially connect to the same NTP host to build confidence in the accuracy of time data received from the same NTP host over time. By monitoring a fleet of NTP hosts 110A, control plane 102 can dynamically define what performance data counts as healthy. For example, an average value of various performance metrics may be calculated for the NTP hosts in the fleet. This way, performance data that is outside of this baseline may be determined as underperforming based on actual performance, rather than an expected performance level.

Figure 2:
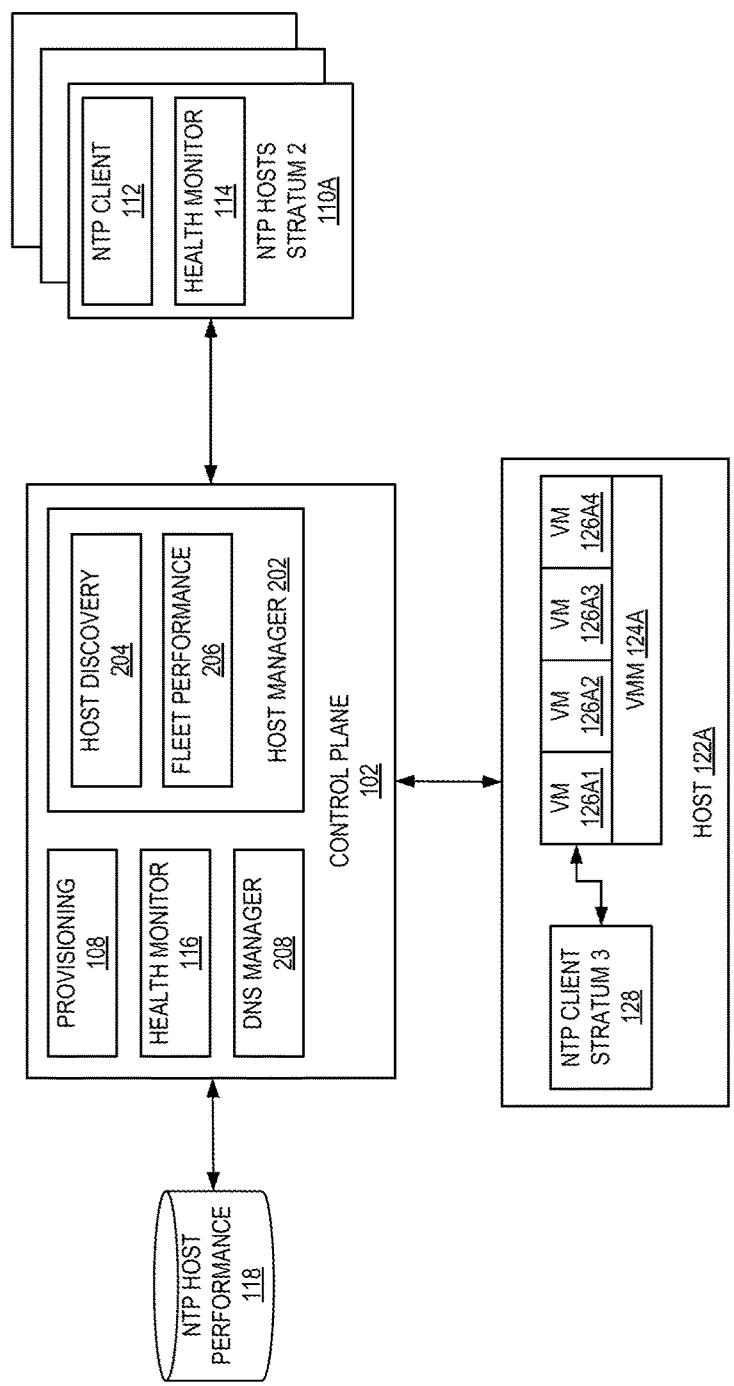
FIG. 2 is a diagram illustrating a control plane of a managed time service according to some embodiments.

FIG. 2 is a diagram 200 illustrating a control plane of a managed time service according to some embodiments. As shown in FIG. 2, a control plane 102 may include a host manager 202. Host manager 202 can perform host discovery 204 and evaluate fleet performance 206. When a new NTP host is added to the managed time system, the new NTP host can publish to the control plane that it is available. As discussed, new NTP hosts can be packaged with each new host computer 122 or with a set of new host computers. For example, when a new host computer is added, any packaged NTP hosts related to that new host computer are detected when they publish their availability to the control plane. The control plane can begin an automated on-boarding process for the NTP hosts (e.g., update configuration data such as address data for stratum 1 devices, etc.).

The automated onboarding process may also include an initial performance check. Host discovery 204 can receive the published availability messages from new NTP hosts and instruct health monitor 116 to verify the performance of the new NTP hosts. Health monitor 116 can collect performance data from health monitor 114 and self-reported performance data from the NTP host. If the new NTP host is determined to be performing within performance thresholds, the host manager 202 can instruct DNS manager 208 to add the new NTP host to the pool of available NTP hosts in the zonal DNS pool. If one of the NTP hosts of a host computer is determined to be underperforming, the control plane can provide a temporary replacement NTP host which may or may not be the most local NTP host.

In some embodiments, fleet performance module 206 can monitor (e.g., collect performance data from) a fleet of NTP hosts 110A. Fleet performance module 206 can determine an average value of various performance metrics across the fleet. These average values may be used as the baseline performance level for NTP hosts in the fleet (e.g., hosts having performance metrics that are less than average over a configurable amount of time may be classified as underperforming). Control plane 102 can calculate these averages dynamically over time and/or continuously. Thus, rather than relying on predefined thresholds, in some embodiments, these averages can be used to dynamically revise performance thresholds based on the actual performance of the fleet of NTP hosts. In some embodiments, the baseline performance level may be determined to be less than the average performance level. For example, an average value of various performance metrics may be calculated for the NTP hosts in the fleet and the baseline value for the performance metrics may be a fraction of the average value (e.g., 90% of the average value of a metric may be the baseline value). This way, NTP host performance data that is more than a threshold level outside of this baseline may be determined as underperforming. When an NTP host is determined to be underperforming, provisioning module 108 can deactivate the underperforming host and DNS manager 208 can remove the underperforming host from the zonal DNS.

Figure 3:
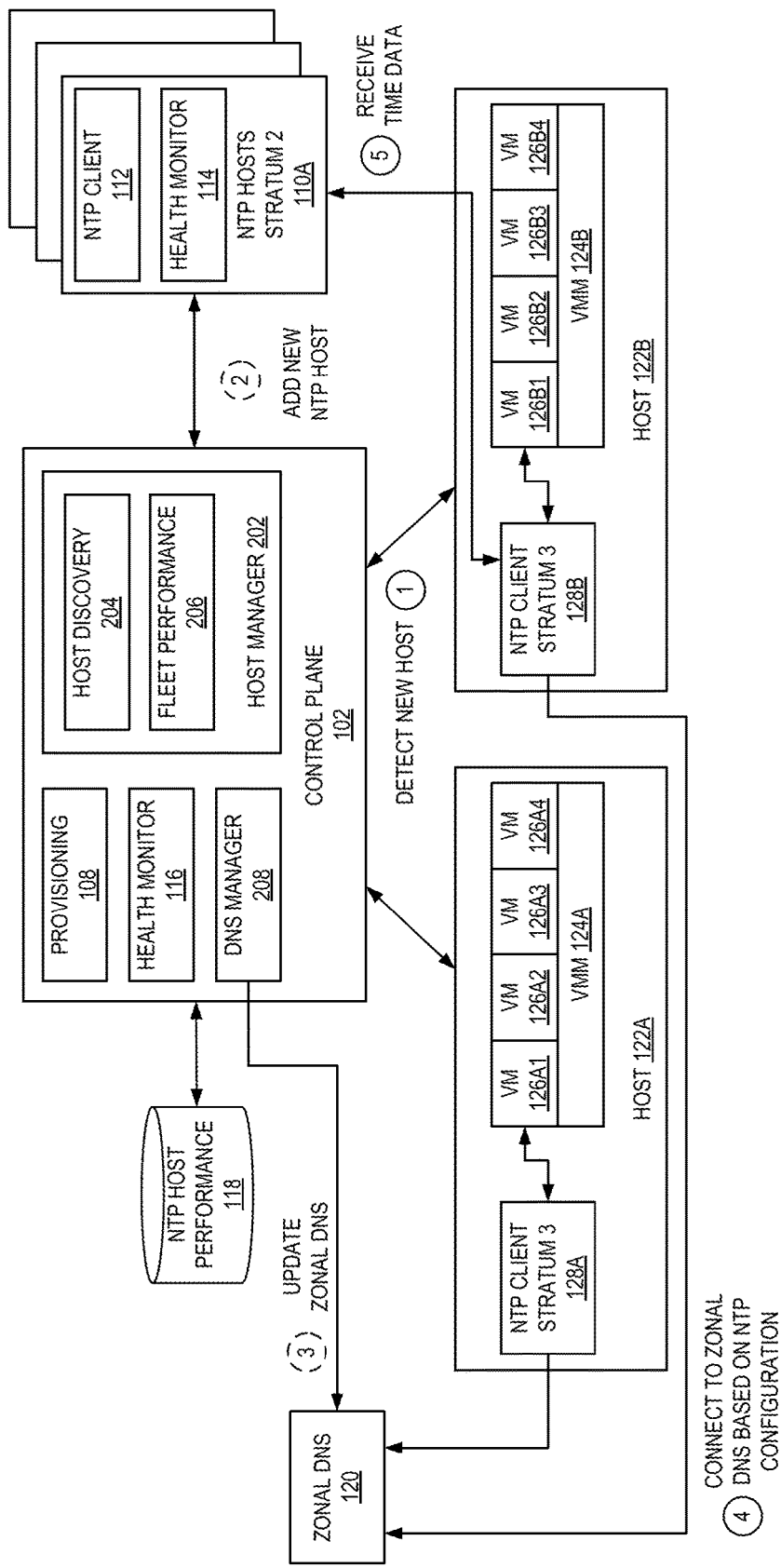
FIG. 3 is a diagram illustrating adding a new host which uses a managed time service according to some embodiments.

FIG. 3 is a diagram 300 illustrating adding a new host which uses a managed time service according to some embodiments. As shown in FIG. 3, at numeral 1 a new host computer 122B can be detected. The control plane can determine a location of the host, such as by using an identifier provided by the host such as a server identifier, a data center identifier, top of rack (TOR) switch identifier, or other location identifier or by using the server's IP address. As the host computer 122B is activated, configuration data for accessing zonal DNS 120 can be pushed to, or requested by, the host computer 122B. In some embodiments, the host computer 122B may be preconfigured with the data to access the zonal DNS (e.g., an IP address, endpoint, or other location with which to communicate with the NTP).

In some embodiments, the host computer may be packaged with one or more NTP hosts. These one or more new NTP hosts can be added to support the new host computer, as shown at numeral 2. For example, control plane 102 can provision a new NTP host 110 to be setup on host 122B or locally in a set of hosts that includes host 122B. In a specific example, the new NTP host can be provisioned in the same rack that the host computer or on a rack that has similar network locality, such as sharing the same TOR or aggregation router. As discussed, one or more performance checks can be performed on the new NTP hosts and then the NTP hosts can be added to the zonal DNS 120, as shown at numeral 3. NTP client 128B can be started to serve time data to instances 128B on new host computer 122B.

As shown at numeral 4, the NTP client 128B can request an NTP host from zonal DNS 120. The zonal DNS can provide the NTP client with an address of its local NTP host or hosts. For example, the host computer 122B can be added to a location that is already associated with a pool of NTP hosts. The zonal DNS can return the pool of NTP hosts associated with that location. Alternatively, as discussed above with respect to numerals 2 and 3, new NTP hosts packaged with the new host machine can be bound to the new NTP client by the zonal DNS. As discussed, control plane 102 can manage the zonal DNS 120 by location (e.g., data center identifier, top of rack (TOR) switch identifier, or other location identifier). Because the host computers 122A and 122B are unaware of their locations, the zonal DNS can determine the location of the host 122B and return a local NTP host for use. As shown at numeral 5, the NTP client can begin polling time data from its assigned NTP host. The NTP client can synchronize local time on the new host computer 122B. When an instance 126B requests current time, the NTP client can return the synchronized time from maintained on the host computer immediately.

Figure 4:
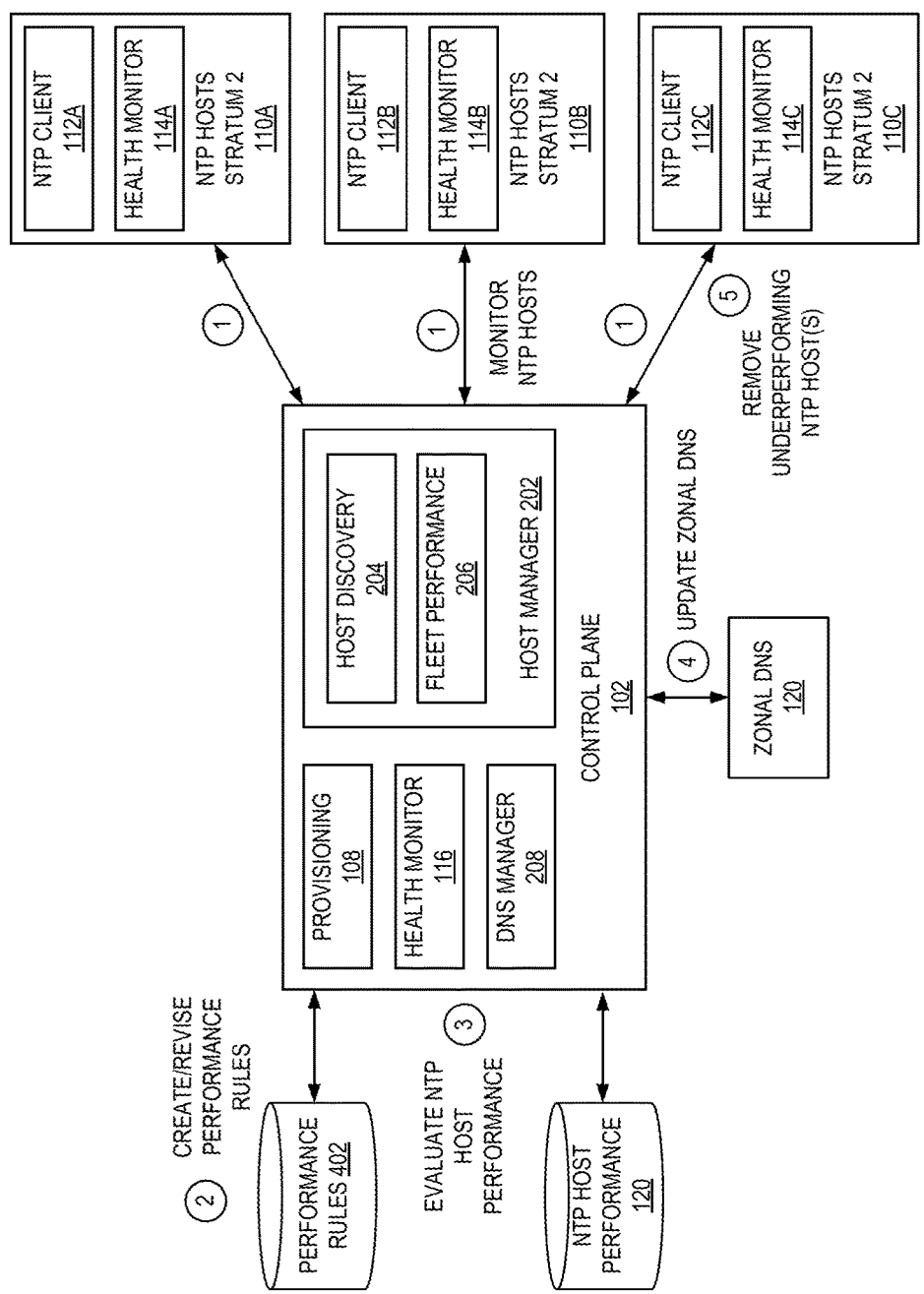
FIG. 4 is a diagram illustrating management of NTP hosts according to some embodiments.

FIG. 4 is a diagram 400 illustrating management of NTP hosts according to some embodiments. As shown in FIG. 4, control plane 102 is responsible for monitoring and scaling NTP hosts 110 in the managed time service. As shown at numeral 1, the control plane can receive performance data for each NTP host in the fleet. As discussed, the performance data can include various metrics, such as offset (e.g., difference between time maintained by the NTP host and authoritative time), network delay, dispersion (e.g., a measured variance of time data from one or more NTP hosts), disk usage, packet loss, etc. Fleet performance module 206 can monitor (e.g., collect performance data from) a fleet of NTP hosts 110. As discussed, fleet performance module 206 can determine an average value of various performance metrics across the fleet.

As shown at numeral 2, these average values may be used to generate one or more performance rules 402. The performance rules may be based on the calculated average values. For example, if the average offset across the fleet of NTP hosts is 150 milliseconds, then the offset rule can be defined as any offset greater than 150 milliseconds is underperforming. Alternatively, the rule may include a threshold above or below the average value to avoid labeling approximately half of the fleet as underperforming at any given time. For example, the offset rule may include a threshold of 20% of the average value, making the rule as any offset greater than 180 milliseconds. The rules may also define a time period over which the underperforming value is detected. For example, an NTP host may need to have an offset measured to be exceeding 180 milliseconds for more than 10 minutes. Additional performance metrics may include network delay time and root dispersion (which may represent the amount of difference in time data received from different NTP hosts, as dispersion or network delay increases the accuracy of the offset value may be reduced).

Using the performance rules, individual host performance can be evaluated at numeral 3. This may be performed by analyzing stored host performance data 120 or in real time as the performance data is received. The NTP host performance data can be compared to the performance rules 402. If an NTP host is underperforming, the DNS manager 208 can remove the host from the zonal DNS pool, as shown at numeral 4. The provisioning module may then deactivate the underperforming NTP host, as shown at numeral 5.

Depending on how the NTP host is underperforming, different attempts may be made to address the underperformance. For example, if the NTP host is dropping packets, that may indicate that the host is saturated (e.g., serving too many NTP clients). Although NTP hosts are randomly selected from the pool of local NTP hosts, some clustering can happen over time resulting in some NTP hosts serving too many clients while other NTP hosts have excess capacity. To address this type of underperformance, the NTP host can be deactivated for a configurable period of time. During this time, the NTP clients will connect to other NTP hosts. The underperforming NTP host can then be reactivated and begin serving clients again.

In some embodiments, if an NTP host is determined to be underperforming due to saturation, the control plane 102 can add additional capacity to the location associated with the overloaded NTP host. For example, additional NTP hosts can be added to servers connected to the same ToR switches, aggregation switches, or other compute resources to expand capacity. Additionally, or alternatively, control plane 102 can increase locality of NTP hosts to NTP clients by changing how locations are defined in the zonal DNS. For example, if locations are defined by aggregation switches, (e.g., a pool of NTP hosts are associated with every host computer connected to ToR switches that are connected to an aggregation switch), the location granularity may be made finer such that a different pool of NTP hosts is associated with each ToR switch or with each host computer. The locations of NTP clients can likewise be updated based on the new location definitions in the zonal DNS. In some embodiments, if an NTP host associated with a host computer becomes saturated, a data structure used to define groups associated with locations can be partitioned or sharded into multiple locations. Likewise, if NTP hosts associated with a given partition or shard becomes saturated, the partition or shard may be further divided into multiple locations and potentially new NTP hosts can be added to the new partitions. By adjusting the definitions of locations, locality of NTP hosts and clients can be increased, improving accuracy of time data received from the NTP hosts. Additionally, increasing capacity to finer grain locations enables those clients generating the most activity (e.g., polling the NTP hosts to maintain accurate time data) to be targeted with increased NTP hosts, leading to a more efficient allocation of resources.

Figure 5:
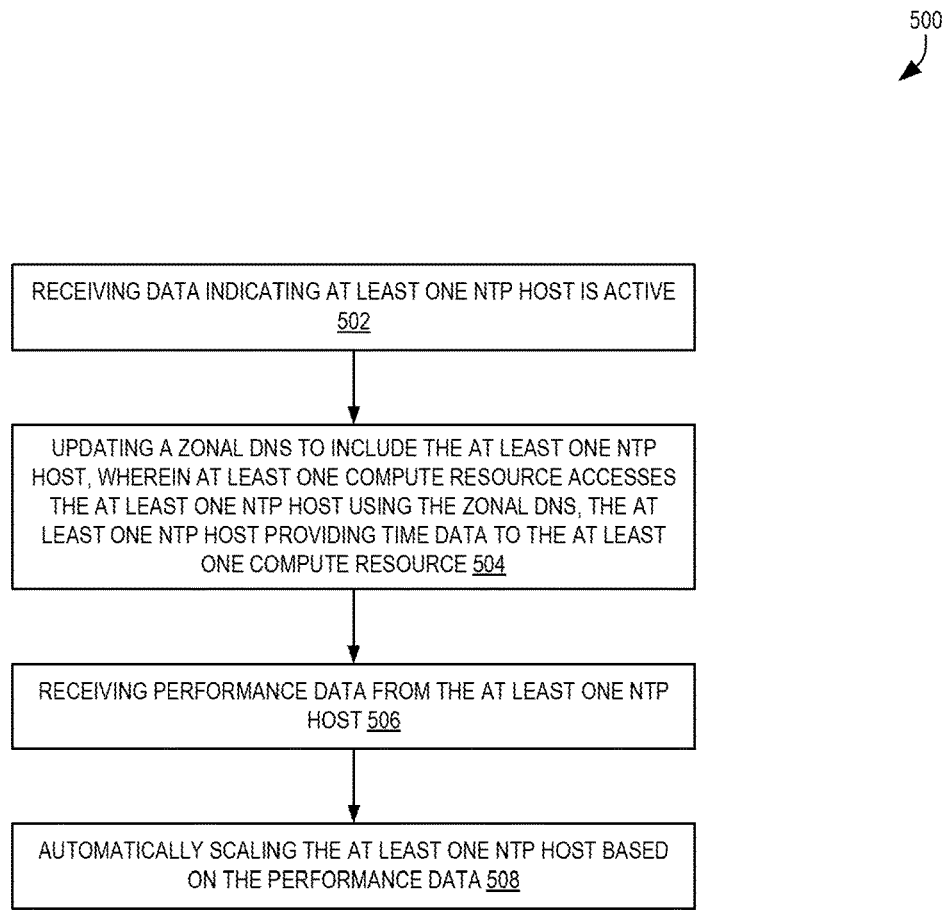
FIG. 5 is a flow diagram illustrating operations for providing a managed time service according to some embodiments.

FIG. 5 is a flow diagram 500 illustrating operations for providing a managed time service according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the control plane or zonal DNS of the other figures.

The operations 500 include, at block 502, receiving data indicating one or more network time protocol (NTP) hosts are active. As discussed, when a new host computer is brought online, the host computer may be packaged with one or more NTP hosts. The NTP hosts can be activated and publish their availability to a control plane of the time service. The control plane can run one or more performance checks on the new NTP hosts before publishing them to a zonal DNS for use by various instances in a hardware virtualization service environment.

The operations 500 include, at block 504, updating a zonal domain name system (DNS) to include the one or more NTP hosts. The at least one compute resource accesses the one or more NTP hosts using the zonal DNS, the one or more NTP hosts providing time data to the at least one compute resource. As discussed, an NTP client can request an NTP host from the zonal DNS. The zonal DNS can provide the NTP client with an address of its local NTP host or hosts. As discussed, control plane can manage the zonal DNS by location. Because the host computers are unaware of their locations, the zonal DNS can determine the location of the host and return a local NTP host for use.

The operations 500 include, at block 506, receiving performance data from the one or more NTP hosts. As discussed, performance of the NTP host fleet can be received including various performance metrics (e.g., offset, dropped packets, root dispersion, etc.). Performance data can be used to determine average metrics for the fleet, and these averages can be used as the baseline performance level for NTP hosts in the fleet (e.g., hosts having performance metrics that are less than average over a configurable amount of time may be classified as underperforming). The control plane can calculate these averages dynamically over time and/or continuously. In some embodiments, the baseline performance level may be determined to be less than the average performance level. For example, an average value of various performance metrics may be calculated for the NTP hosts in the fleet and the baseline value for the performance metrics may include a buffer above or below the average value (e.g., 90% of the average value of a metric may be the baseline value). This way, NTP host performance data that is more than a threshold level outside of this baseline may be determined as underperforming.

The operations 500 include, at block 508, automatically scaling the one or more NTP hosts based on the performance data. In some embodiments, scaling may include determining the performance data from at least one of the one or more NTP hosts exceeds a fleetwide performance threshold over a first time period. The control plane can then activate at least one NTP host and add the at least one NTP host to the zonal DNS.

In some embodiments, automatically scaling may include determining the performance data from at least one of the one or more NTP hosts exceeds a fleetwide performance threshold over a first time period. The at least one of the one or more NTP hosts may be deactivated and then removed from the zonal DNS. In some embodiments, the control plane may wait a second time period before reactivating the at least one of the one or more NTP hosts, and re-adding the at least one of the one or more NTP hosts to the zonal DNS. For example, where an NTP host has become saturated, the NTP host can be temporarily taken offline to allow NTP clients to be reallocated among the available NTP hosts in the DNS pool. The deactivated NTP host may then be brought back online to serve clients again.

In some embodiments, performance data can be received from a plurality of NTP hosts, the performance data including at least one metric. At least one fleetwide metric can be determined from the at least one metric, and a performance rule can be generated using the at least one fleetwide metric. The at least one fleetwide performance threshold includes one or more of offset, network delay, dispersion, disk usage, or packet loss.

In some embodiments, the zonal DNS can receive a request from an NTP client to connect to at least one NTP host. The zonal DNS can determine a location of the NTP client, and provide address data for the at least one NTP host based on the location of the NTP client. In some embodiments, the control plane can detect a request received by zonal DNS is from a new NTP client, the NTP client executing on a new host device. The control plane can determine a location of the new NTP client, activate a new NTP host, and add the new NTP host to the zonal DNS. The control plane can then provide address data for the new NTP host to the new NTP client. The at least one NTP client can then retrieve time data from the at least one NTP host.

In some embodiments, the control plane can determine that a first NTP host associated with a first location is saturated. As discussed, the control plane can adjust the location granularity by redefining the first location in the zonal DNS to comprise a second location and a third location. The NTP hosts and clients can be reallocated among the new locations, based on the newly defined locations. For example, the first NTP host can be assigned to the second location. The control plan can also increase capacity targeted to the new locations. For example, the control plane can activate at least one new NTP host in the third location, and add the at least one new NTP host to the zonal DNS associated with the third location.

Figure 6:
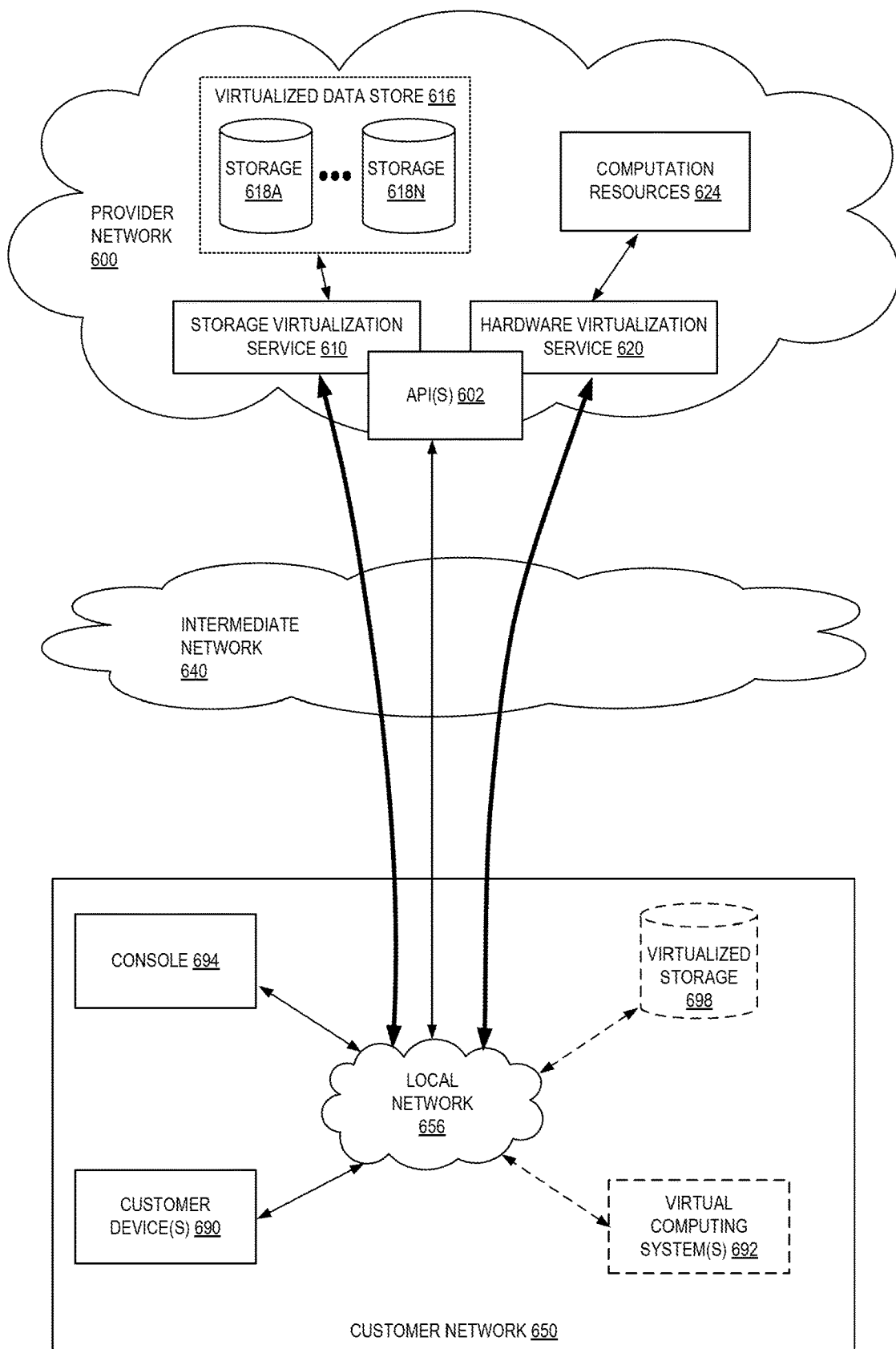
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694. In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 or console 694, the customer may access the functionality of storage virtualization service 610, for example via one or more APIs 602, to access data from and store data to a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
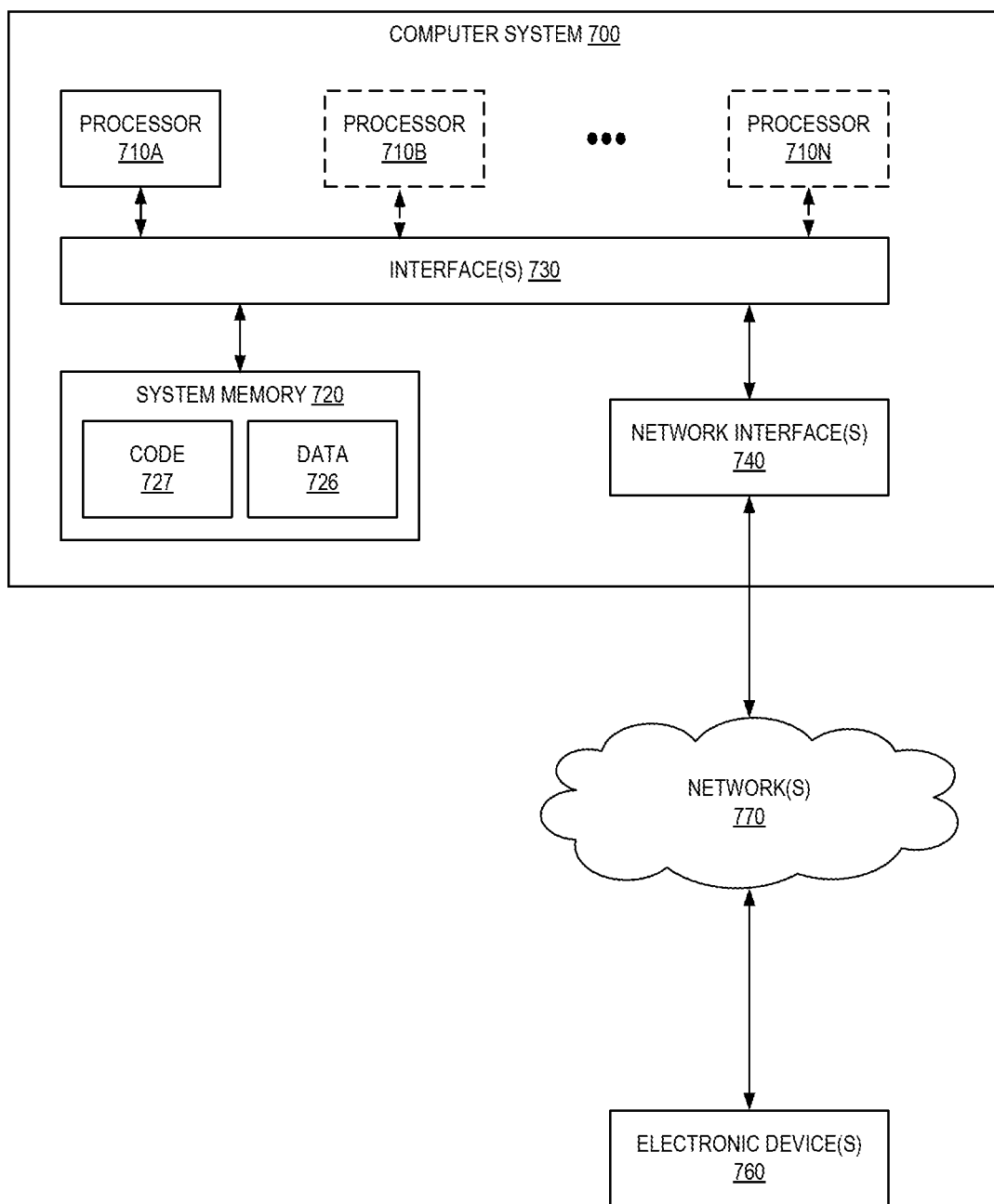
FIG. 7 is a block diagram illustrating an example computer system that may be used in some embodiments.

In some embodiments, a system that implements a portion or all of the techniques for providing a managed time service as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via I/O any other suitable type of network and/or protocol.

In some embodiments, system memory 720 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 122A-122B, 110A-110C, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   monitoring, by a control plane of a managed time service, a plurality of network time protocol (NTP) hosts to obtain performance data for the plurality of NTP hosts, each synchronizing time on the at least one host computer with a grandmaster clock;
   storing the performance data for the plurality of NTP hosts in at least one database, the performance data including at least one of offset, network delay, dispersion, disk usage, or packet loss for each of the plurality of NTP hosts;
   determining a first NTP host is underperforming by comparing the performance data for the first NTP host to a plurality of performance rules, the performance rules defined using an average of the performance data for the plurality of NTP hosts;
   updating a zonal domain name system (DNS) to remove the first NTP host, wherein at least one host computer accesses the first NTP host using the zonal DNS;
   determining a location associated with the at least one host computer;
   identifying a second NTP host associated with the location in the zonal DNS; and
   providing address data for the second NTP host to the at least one host computer.

2. The computer-implemented method of claim 1, further comprising:
   receiving data indicating a new NTP host is active;
   determining a location associated with the new NTP host;
   testing performance of the new NTP host; and
   adding the new NTP host to the zonal DNS using the location of the new NTP host.

3. The computer-implemented method of claim 1, further comprising:
   activating a new NTP host associated with the location of the first NTP host;
   adding the new NTP host to the zonal DNS using the location of the first NTP host; and
   providing address data for the new NTP host to the at least one host computer.

4. A computer-implemented method comprising:
   receiving data indicating one or more network time protocol (NTP) hosts are active;
   updating a zonal domain name system (DNS) to include the one or more NTP hosts, wherein at least one compute resource is configured to access the one or more NTP hosts using the zonal DNS, the one or more NTP hosts providing time data to the at least one compute resource;
   receiving performance data from the one or more NTP hosts; and
   scaling the one or more NTP hosts based on the performance data including
      determining the performance data from at least one of the one or more NTP hosts exceeds a fleetwide performance threshold over a first time period;
      activating at least one new NTP host; and
      adding the at least one new NTP host to the zonal DNS.

5. The computer-implemented method of claim 4 wherein automatically scaling the one or more NTP hosts based on the performance data further comprises:
   determining the performance data from at least one of the one or more NTP hosts exceeds a fleetwide performance threshold over a first time period;
   deactivating the at least one of the one or more NTP hosts; and
   removing the at least one of the one or more NTP hosts from the zonal DNS.

6. The computer-implemented method of claim 5 further comprising:
   waiting a second time period;
   reactivating the at least one of the one or more NTP hosts; and
   re-adding the at least one of the one or more NTP hosts to the zonal DNS.

7. The computer-implemented method of claim 5 further comprising:
   receiving the performance data from a plurality of NTP hosts;
   calculating at least one average metric based on the performance data;
   determining the at least one fleetwide performance threshold from the at least one metric; and
   generating a performance rule using the at least one fleetwide performance threshold.

8. The computer-implemented method of claim 4 wherein the at least one fleetwide performance threshold includes one or more of offset, network delay, root dispersion, disk usage, or packet loss.

9. The computer-implemented method of claim 4 further comprising:
   receiving, by the zonal DNS, a request from an NTP client to connect to at least one NTP host;
   determining a location of the NTP client; and
   providing address data for a plurality of NTP hosts based on the location, the plurality of NTP hosts including the at least one NTP host.

10. The computer-implemented method of claim 4, further comprising:
    activating a new NTP host;
    adding the new NTP host to the zonal DNS; and
    detecting a request received by zonal DNS is from a new NTP client, the NTP client executing on a new compute resource;
    determining a location of the new NTP client;
    providing address data for the new NTP host to the new NTP client.

11. The computer-implemented method of claim 4 further comprising:
    determining a first NTP host associated with a first location is saturated;
    redefining the first location in the zonal DNS to comprise a second location and a third location;
    assigning the first NTP host to the second location;
    activating at least one new NTP host in the third location; and adding the at least one new NTP host to the zonal DNS associated with the third location.

12. A system comprising:
a first one or more electronic devices including at least one memory and at least one processor, the first one or more electronic devices implementing a control plane, the control plane including instructions that upon execution by the at least one processor cause the control plane to:
receive data indicating one or more network time protocol (NTP) hosts are active;
update a zonal domain name system (DNS) to include the one or more NTP hosts, wherein at least one compute resource is configured to access the one or more NTP hosts using the zonal DNS, the one or more NTP hosts providing time data to the at least one compute resource;
receive performance data from the one or more NTP hosts; and
scale the one or more NTP hosts based on the performance data including
determining the performance data from at least one of the one or more NTP hosts exceeds a fleetwide performance threshold over a first time period;
activating at least one NTP host; and
adding the at least one NTP host to the zonal DNS.

13. The system of claim 12 wherein the instructions to scale the one or more NTP hosts based on the performance data, when executed, further cause the control plane to:
determine the performance data from at least one of the one or more NTP hosts exceeds a fleetwide performance threshold over a first time period;
deactivate the at least one of the one or more NTP hosts; and
remove the at least one of the one or more NTP hosts from the zonal DNS.

14. The system of claim 13 wherein the instructions, when executed, further cause the control plane to:
wait a second time period;
reactivate the at least one of the one or more NTP hosts; and
re-add the at least one of the one or more NTP hosts to the zonal DNS.

15. The system of claim 13 wherein the instructions, when executed, further cause the control plane to:
receive the performance data from a plurality of NTP hosts;
calculate at least one average metric based on the performance data;
determine the at least one fleetwide performance threshold from the at least one metric; and
generate a performance rule using the at least one fleetwide performance threshold.

16. The system of claim 15 wherein the at least one fleetwide performance threshold includes one or more of offset, network delay, dispersion, disk usage, or packet loss.

17. The system of claim 12 wherein the instructions, when executed, further cause the control plane to:
receive, by the zonal DNS, a request from an NTP client to connect to at least one NTP host;
determine a location of the NTP client; and
provide address data for a plurality of NTP hosts based on the location, the plurality of NTP hosts including the at least one NTP host.

18. The system of claim 12, wherein the instructions, when executed, further cause the control plane to:
activate a new NTP host;
add the new NTP host to the zonal DNS;
detect a request received by zonal DNS is from a new NTP client, the NTP client executing on a new compute resource;
determine a location of the new NTP client; and
provide address for the new NTP host to the new NTP client.

* * * * *